May 2, 1961
J. B. HIRSCHMANN
2,981,957
WELDING GOGGLE
Filed Dec. 15, 1958
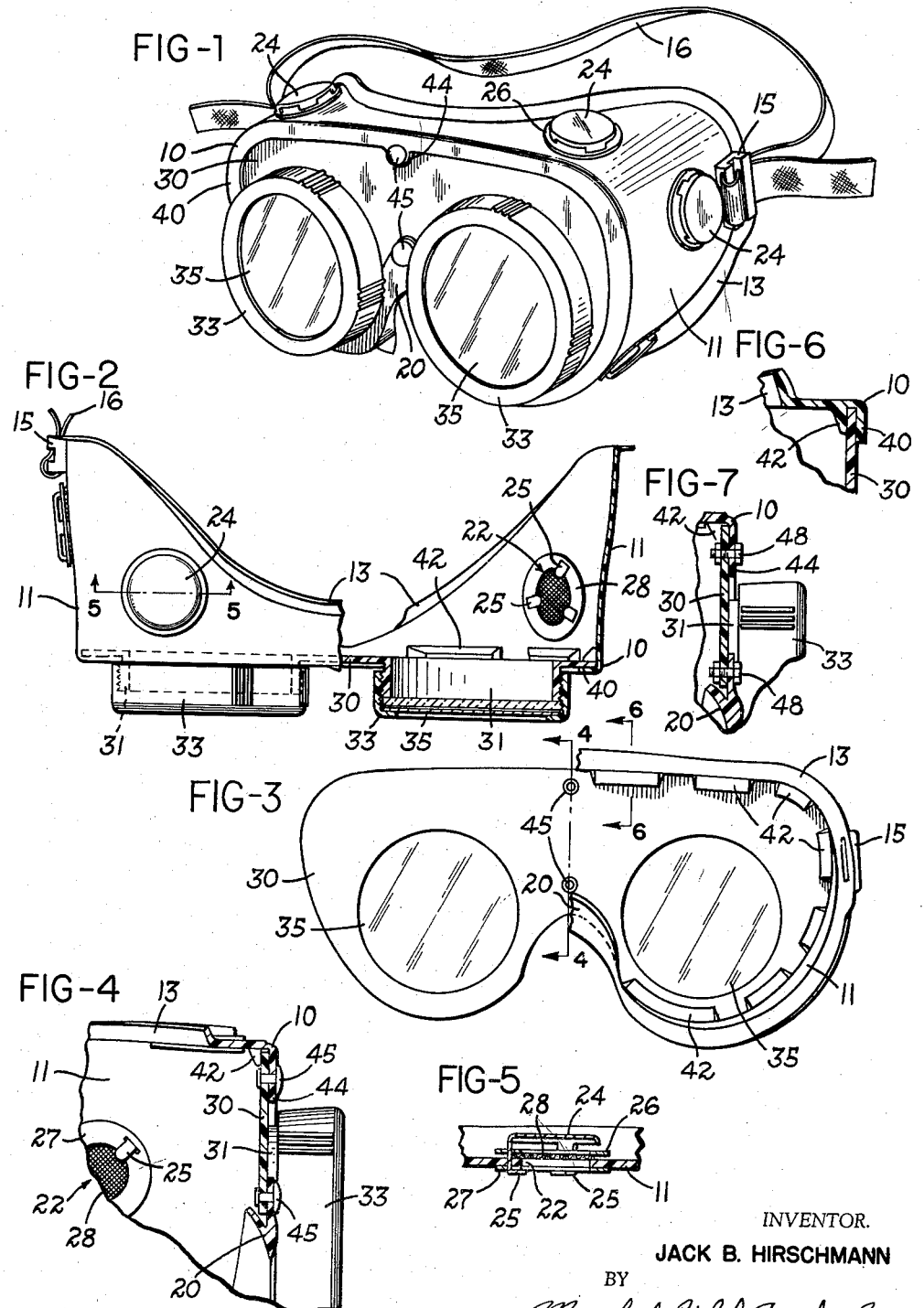
INVENTOR.
JACK B. HIRSCHMANN
BY
Marechal, Biebel, French & Bugg
ATTORNEYS United States Patent Office 2,981,957
Patented May 2, 1961

2,981,957
WELDING GOGGLE
Jack B. Hirschmann, Fairhaven, Mass.
(% The H. L. Bouton Co., Buzzards Bay, Mass.)
Filed Dec. 15, 1958, Ser. No. 780,589
1 Claim. (Cl. 2—14)

This invention relates to goggles for eye protection, and more particularly to a welding goggle.

It is a primary object of the invention to provide a welding goggle of improved and simplified construction which offers a high degree of comfort to the wearer while at the same time affording assured protection against both the light and heat developed by welding operations.

It is particularly an object of the invention to provide a welding goggle which is generally of the single aperture construction now commonly employed in goggles for other types of eye protection, which therefore offers a large single eye chamber for improved ventilation as compared with the double-cup type of welding goggle, and which also is constructed to give maximum assurance against accidental dislodgement of the eye-protecting front portion of the goggle from the frame while it is in use.

Additional objects of the invention will be apparent from the following description, the accompanying drawing and the appended claim.

In the drawing:

Fig. 1 is a front perspective view of a welding goggle constructed in accordance with the invention;

Fig. 2 is a view of the goggle of Fig. 1 partly in plan and partly broken away in section through one of the eye pieces;

Fig. 3 is an elevational view of the goggle from the back with portions of the frame broken away;

Fig. 4 is an enlarged fragmentary section on the line 4—4 of Fig. 3;

Fig. 5 is a fragmentary section on the line 5—5 of Fig. 2;

Fig. 6 is a fragmentary section on the line 6—6 of Fig. 3; and

Fig. 7 is a fragmentary sectional view taken in the same location as Fig. 4 but showing a modified construction.

Referring to the drawing, which illustrates preferred embodiments of the invention, the goggle includes a one-piece frame which is readily molded from rubber or other material of suitable flexibility such particularly as vinyl plastic, and if this material is not naturally opaque, it should incorporate a pigment or other filler capable of absorbing both light and infrared radiation. This frame includes a front rim 10 and a back portion 11 which extends rearwardly from the rim to define the eye chamber of the goggle, and the frame portion 11 in turn includes a peripheral flange 13 for engaging the face of the wearer. At each end of the frame is provided a double lug 15 through which the ends of the head strap 16 are adjustably threaded as shown in Figs. 1 and 2.

The rim 10 of the goggle is formed to define a single aperture comprising a pair of eye portions and a connecting middle portion of reduced vertical extent at the center of the goggle and above the wearer's nose, the rim being formed as shown to provide a saddle-shaped portion 20 defining a nose receiving recess between the eye portions of the aperture. Ventilation holes 22 are also shown in the frame 11, and each of these ventilation holes is provided with a protecting unit for preventing direct passage of light or metal particles therethrough. As shown in detail in Fig. 5, each of these protecting units includes a cup-like member 24 having tabs 25 thereon which extend through the frame and are turned over on the inside in retaining relation with a pair of annular disks 26 and 27, and a screen 28 is thereby held in covering relation with each hole 22 by the associated outer disk 26.

A front plate member 30 substantially complementary in shape to the rim 10 is received therewithin, and this plate member is formed of a relatively rigid material which is substantially impervious to light and resistant to flame, satisfactory results having been obtained with the plate member 30 molded of a plastic material such as cellulose acetate, cellulose acetate butyrate, and polystyrene and including a suitable light absorbing filler. The plate member 30 also includes an integral pair of circular bosses 31 which define the eye openings therethrough, and each of these bosses is threaded at its outer surface to receive a complementary threaded retaining cup 33 for a lens or lenses of appropriate light and heat absorbing characteristics as shown at 35.

It is of major importance to the assured protection of a wearer of a welding goggle of this type that the front plate member 30 be secured against accidental displacement from the frame, and the invention makes special provision to achieve this result. More particularly, the rim 10 includes a front flange 40 on its inner periphery which is proportioned to overhang and form a substantially open continuous seat for the outer marginal strip at the front of the plate member 30. Behind this flange 40 on the inside of the frame are a plurality of shoulders 42 arranged as shown in inwardly spaced relation with the flange 40 to form additional flange means supporting the plate member 30 from the back side thereof, and the flange 40 also includes a tab portion 44 depending from the upper center part thereof into extended overhanging relation with the front of the plate member 30. A pair of rivets 45 form permanent attaching means securing the plate member 30 to the flange 40, one of these rivets penetrating the tab 44 and the upper margin of the plate member 30 and the other rivet being located adjacent the lower edge of the plate member above the nose of the wearer and penetrating the plate member and the flange 40 as shown. The use of rivets has been found particularly satisfactory as preventing the possibility of tampering with the goggles, but other permanent attaching means could be used such as the nut and bolt illustrated at 48 in Fig. 7.

The welding goggle of the invention accordingly offers outstanding practical advantages. Thus it is comparatively light in weight and therefore comfortable to wear, and also the large eye chamber and multiple ventilating openings minimizes the problem of condensation on the inner surfaces of the lenses. In fact, the size and soft material of the frame makes it possible to even wear this goggle comfortably over a pair of conventional spectacles. At the same time, the construction of the invention assures full visual safety at all times in use even with the combination of soft frame and rigid front plate by reason of the permanent connection therebetween.

While the forms of apparatus herein described constitute preferred embodiments of the invention, it is to be understood that the invention is not limited to these precise forms of apparatus, and that changes may be made therein without departing from the scope of the invention which is defined in the appended claim.

What is claimed is:

A welding goggle of the character described comprising a one-piece frame of a relatively soft and flexible opaque material including a front rim portion and a portion extending rearwardly from said rim to fit against the face of the wearer, said rim being constructed to extend around the eyes and above the nose of the wearer and to define an open area including enlarged portions for the eyes of the wearer connected by a portion of reduced vertical extent above the nose of the wearer, a plate member of substantially rigid opaque material proportioned to be received within said rim and of complementary shape thereto, a front flange on the inner periphery of said rim proportioned to overhang and form a substantially open continuous seat for the outer marginal strip of the front of said plate member, said plate member including a pair of spaced circular bosses defining viewing openings therethrough, said bosses being threaded on the outer surfaces thereof, a lens received over the outer end of each said boss, a retaining cup for each said lens threaded on the associated said boss, flange means on the inner surface of said frame arranged in spaced relation with said front flange to support said plate member from the back thereof, permanent attaching means penetrating said front flange and said plate member to secure said plate member within said frame, and a head strap connected with said frame to hold said goggle in position on the head of the wearer.

References Cited in the file of this patent

UNITED STATES PATENTS

| | | |
|---|---|---|
| 1,109,398 | Butler | Sept. 1, 1914 |
| 2,149,514 | Fischer | Mar. 7, 1939 |
| 2,537,275 | Malcom | Jan. 9, 1951 |
| 2,568,882 | Anderson | Sept. 25, 1951 |
| 2,612,640 | Palmes | Oct. 7, 1952 |